United States Patent
Lubbers

[19]

[11] Patent Number: 5,769,589
[45] Date of Patent: Jun. 23, 1998

[54] METHOD FOR TRANSPORTING A CONTAINER AND TRANSPORTING MEANS FOR PERFORMING THE METHOD

[76] Inventor: Robert Marie Lubbers, Paulus Potterlaan 2, Capelle a/d IJssel, Netherlands, 2902 GP

[21] Appl. No.: 640,830

[22] PCT Filed: Nov. 11, 1994

[86] PCT No.: PCT/NL94/00284

§ 371 Date: Jun. 28, 1996

§ 102(e) Date: Jun. 28, 1996

[87] PCT Pub. No.: WO95/13978

PCT Pub. Date: May 26, 1995

[30]     Foreign Application Priority Data

Nov. 16, 1993 [NL] Netherlands .......................... 9301982

[51] Int. Cl.$^6$ ........................................... B65G 1/00
[52] U.S. Cl. ................... 414/268; 414/786; 294/81.1; 901/47
[58] Field of Search ................... 414/268, 269, 414/270, 139.4, 139.9, 140.3, 140.4, 786; 294/81.1; 901/47

[56]     References Cited

U.S. PATENT DOCUMENTS

| | | |
|---|---|---|
| 3,952,891 | 4/1976 | Terayama et al. .................... 414/140.3 |
| 3,958,106 | 5/1976 | Bedford et al. . |
| 4,088,237 | 5/1978 | Brown ...................................... 414/270 |
| 4,973,219 | 11/1990 | Brickner et al. ...................... 414/140.3 |
| 4,980,626 | 12/1990 | Hess et al. ................................ 901/47 |
| 5,096,244 | 3/1992 | Wilson et al. .......................... 294/19.1 |
| 5,280,179 | 1/1994 | Pryor et al. ............................... 901/47 |
| 5,303,034 | 4/1994 | Carmichael et al. ..................... 901/47 |
| 5,380,139 | 1/1995 | Pohjonen et al. ......................... 901/47 |
| 5,421,687 | 6/1995 | Wayman ................................. 414/339 |
| 5,505,585 | 4/1996 | Hubbard .............................. 414/139.4 |
| 5,511,923 | 4/1996 | Dunstam .............................. 414/139.9 |

FOREIGN PATENT DOCUMENTS 4005538  8/1991  Germany ....................... B65G 43/00

*Primary Examiner*—Karen B. Merritt
*Assistant Examiner*—Douglas A. Hess
*Attorney, Agent, or Firm*—Webb Ziesenheim Bruening Logsdon Orkin & Hanson, P.C.

[57]     ABSTRACT

The invention relates to a method for transporting a container from a starting station to one of a plurality of final destinations, whether or not via one or more intermediate destinations, wherein the container is provided with data which defines a predetermined route, which data is read during transport. The data preferably defines a predetermined route and means of transport.

7 Claims, 2 Drawing Sheets

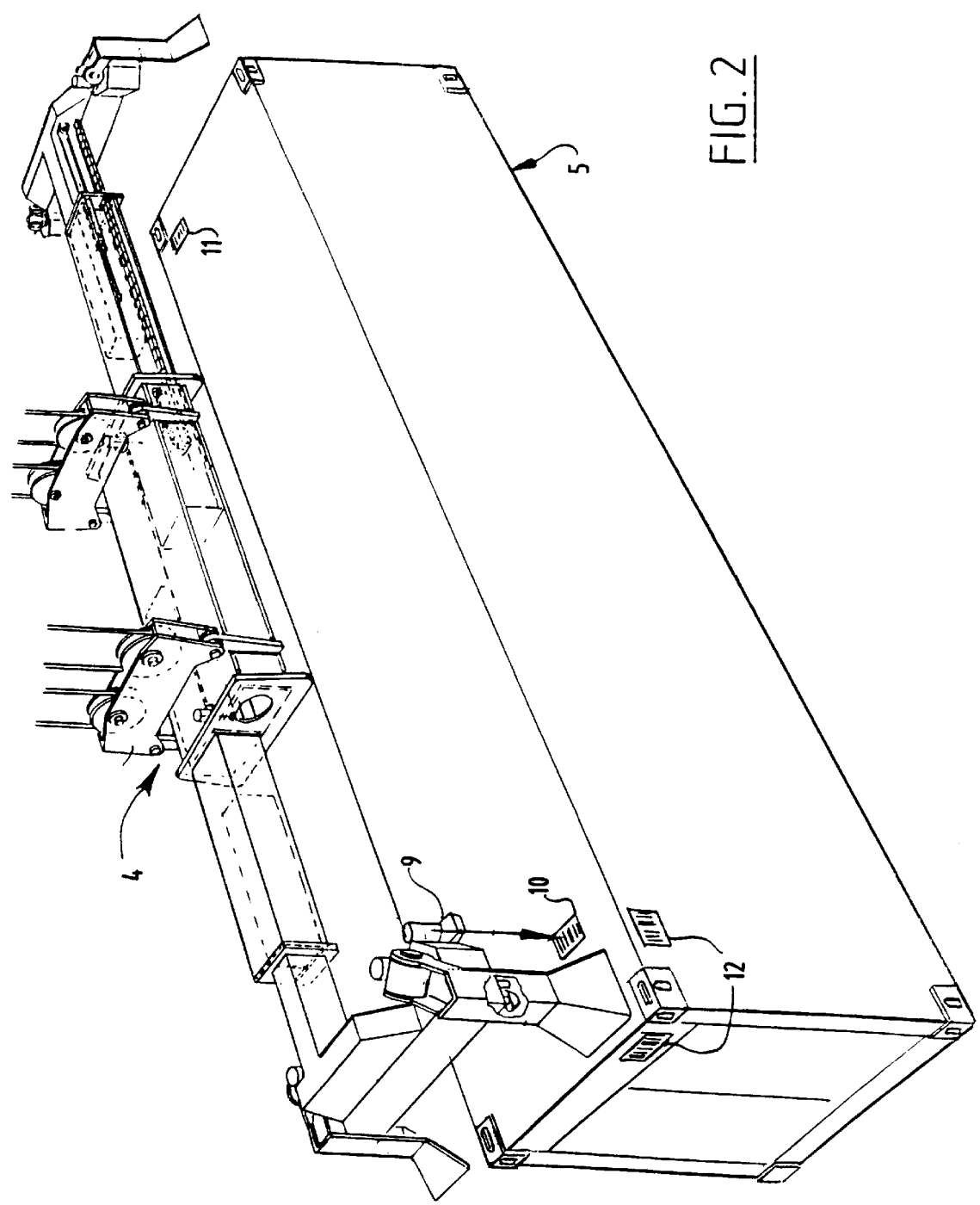

METHOD FOR TRANSPORTING A CONTAINER AND TRANSPORTING MEANS FOR PERFORMING THE METHOD

FIELD OF THE INVENTION

The intention relates to a method for transporting a container from a starting station to one of a plurality of final destinations, whether or not via one or more intermediate destinations, and transporting means suitable for performing this method.

DESCRIPTION OF THE PRIOR ART

The existing method for transporting a container from a starting station to one of a number of final destinations, whether or not this be via one or more intermediate destinations, takes place particularly when a container ship is being unloaded by gripping, displacing and setting down a container, thereafter the transport destination and possible interim destinations are then determined. After the transport destination and possible interim destinations are known the container will once again be gripped for placing on the means of transport suitable for that purpose (train, heavy goods vehicle, other ship etc.) or for storage. The above described method in time-consuming. As transporting means for moving a container for instance from a ship to a train or truck, use is usually made of a "spreader" which is movable in the height and which forms part of for instance a transport crane or a lifting vehicle. The existing usual method consists of taking a container out of a ship using a spreader, whereafter the container is placed on the wharf. The transport route for the container is then determined, whereafter the container is gripped once again to be taken, via a spreader, to the desired intermediate or final destination.

The present invention has for its object to provide an improved method for transporting containers from a starting station to one of a plurality of final destinations, whether or not via one or more intermediate destinations, and a transporting means suitable for performing this method. The improvement is herein focused on limiting the required transporting operations and preventing errors.

SUMMARY OF THE INVENTION

The invention provides for this purpose a method wherein the container is provided with data which defines a predetermined route, which data is read during transport. The invention further provides transporting means comprising a data reader and a data processing unit for performing the described method. With a data reader and a data processing unit the data is read during transport. With this step the destination of a container can be determined or monitored during transport, the operations required for this purpose form part of the transport operations.

The method is preferably characterized in that the data comprises a predetermined route and means of transport. Due to the destination and the subsequent carriage mode becoming known during transport it is for example possible to transfer a container directly from a supply means of transport onto a means of transport for subsequent carriage.

The method is preferably characterized in that the data is read when a container is taken from a means of transport. In this way the destination and/or subsequent carriage mods of the container becomes known when it is gripped and this can be anticipated at an early stage.

The method is further preferably characterized in that the data is arranged on the containers at a standardized position. Reading of the data is in this way simplified.

The data reader is preferably connected to a device for moving the container. This step creates the possibility of reading the transport data immediately on coupling of the moving device and the container.

The data reader is preferably a bar code reader or a magnetic code reader. These already existing readers can be used reliably in such an application.

BRIEF DESCRIPTION OF THE DRAWING

The present invention will be further elucidated with reference to the annexed figures which show non-limitative embodiments. In the drawing;

FIG. 2 shows a perspective view of a spreader and container.

DESCRIPTION OF THE PREFERRED EMBODIMENTS

Figure 1:
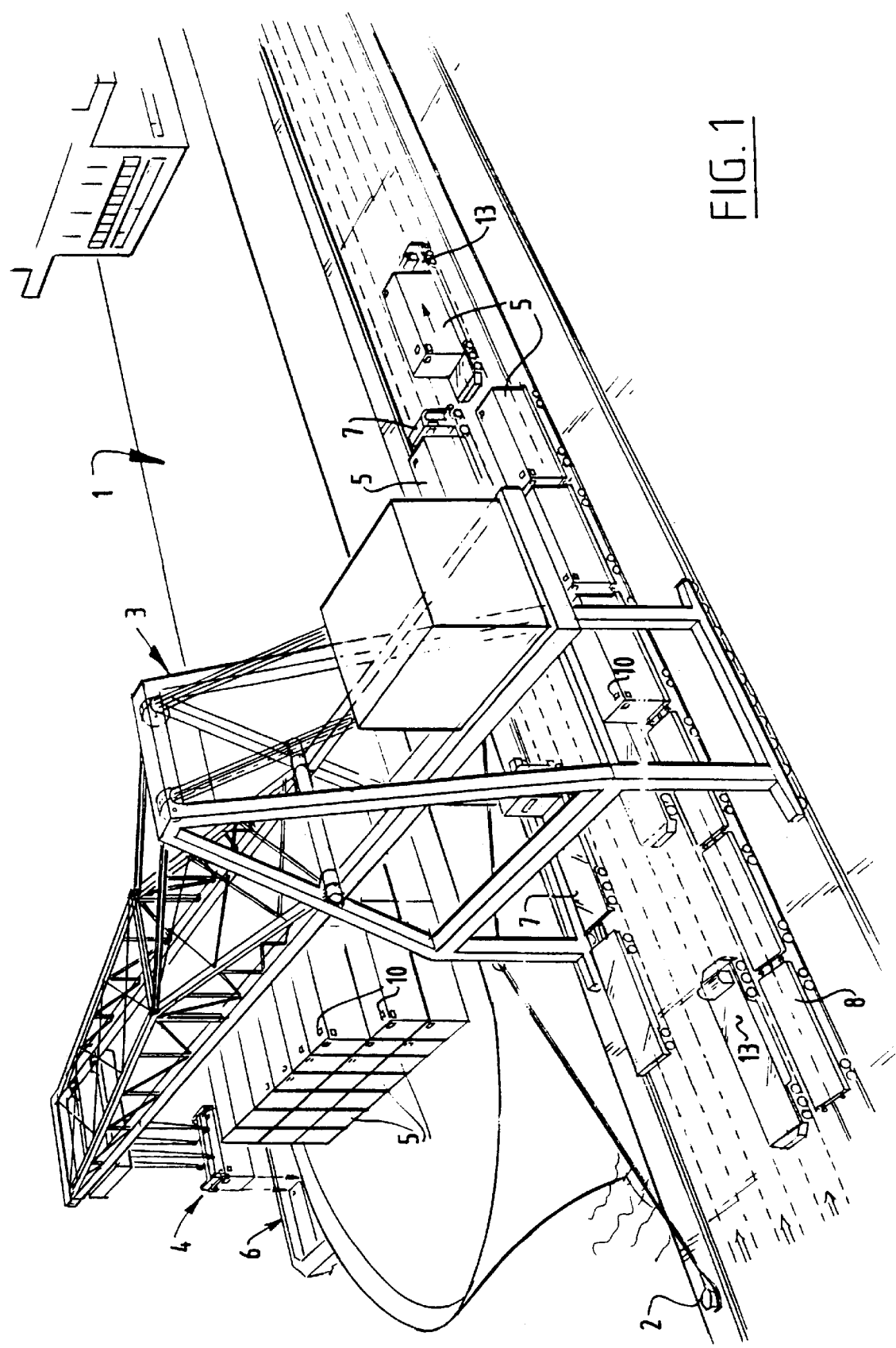
FIG. 1 shows a perspective view of a container ship moored at quayside.

FIG. 1 shows a container ship 1 moored at a quay 2 on which stands crane 3. The crane 3 comprises a displaceable spreader 4 for gripping and moving containers 5. Particularly in the case of transshipment of the containers 5 from the container ship 1 to another means of transport it is important to know the desired destination and the mode of carriage for the subsequent transport to be used for container 5, since there exist many different destinations for a container 5. It is thus possible to place the container 5 on another ship 6 (for instance a barge or coaster), an articulated truck 7, a train 8 or an unmanned vehicle. Because the data arranged on a container 5 is read immediately the container 5 is gripped with the spreader 4, it is possible to determine the destination of the gripped container 5. The data arranged can also be used during further transport of container 5 to determine or check the destination thereof.

FIG. 2 shows in detail a container 5 and a spreader 4. The latter is provided with a data reader 9 with which the data 10 arranged at a standardized position an container 5 can be read. This data can be arranged on container 5 for instance in the form of a sticker. Because the same data 11 is arranged in the corner diagonally opposite the corner in which the data 10 is arranged it is not important how the spreader 4 grips the container 5 from above; the data 10, 11 can always be read. Other sides of container 5 can also be provided with data 12 corresponding with the above mentioned data 10, 11. Due to this data 12 arranged on the sides of container 5 it is possible to move a container for instance with a side spreader and meanwhile read the data 12. The data 10, 11, 12 can for instance also be used to control an unmanned vehicle 13 as shown in FIG. 1 on which the container 5 is placed. It is possible to envisage here a wagon displaceable along a guiding wherein readers are arranged at standardized distance from the guiding for the purpose of reading the data 10, 11, 12.

I claim:

1. A method for transporting a container from a starting station to one of a plurality of final destinations via a container moving means having a container gripping means, comprising the steps of:

providing the container with data identifying the container;

positioning a container gripping means to grip the container, the container gripping means having a data reader attached thereto to read the data when the container gripping means is positioned to grip the container; and reading the data with the data reader.

2. Method as claimed in claim 1, wherein the data defines a predetermined route and means of transport.

3. Method as claimed in claim 1 further including the steps of:

gripping the container; and moving the container from a means of transport, wherein the data is read when the container is taken from the means of transport.

4. Method as claimed in claim 1, including arranging the data on the container at a standardized position.

5. A transport means for transporting a container, the transport means comprising:

a container moving means having a container gripping means for gripping the container;

control means to control the movements of the gripping means; and a data reader attached to the container gripping means and connectable to a data processing unit for reading and processing data from the container, wherein the data reader is attached so that positioning the container gripping means to grip the container positions the data reader to read the data from the container.

6. Transporting means as claimed in claim 5, wherein the data reader is a bar code reader.

7. Transporting means as claimed in claim 5, wherein the data reader is a magnetic code reader.

* * * * *